(12) United States Patent
Copeland

(10) Patent No.: US 8,881,533 B2
(45) Date of Patent: Nov. 11, 2014

(54) TURBINE ENGINE

(75) Inventor: Andrew D. Copeland, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1020 days.

(21) Appl. No.: 12/850,926

(22) Filed: Aug. 5, 2010

(65) Prior Publication Data

US 2012/0031104 A1 Feb. 9, 2012

(51) Int. Cl.
*F02C 7/26* (2006.01)
*F02C 7/36* (2006.01)
*F02C 7/32* (2006.01)

(52) U.S. Cl.
CPC .... *F02C 7/36* (2013.01); *F02C 7/32* (2013.01)
USPC .................. 60/788; 60/786; 60/778; 60/801; 60/802

(58) Field of Classification Search
USPC ............................ 60/778, 786, 788, 801, 802
See application file for complete search history.

(56) References Cited

U.S. PATENT DOCUMENTS

| | | | | |
|---|---|---|---|---|
| 2,407,060 A | * | 9/1946 | Croft | 192/93 C |
| 4,075,910 A | | 2/1978 | Davis et al. | |
| 4,077,202 A | | 3/1978 | Schutze | |
| 4,473,752 A | | 9/1984 | Cronin | |
| 4,684,081 A | | 8/1987 | Cronin | |
| 5,253,470 A | * | 10/1993 | Newton | 60/39.08 |
| 5,319,989 A | * | 6/1994 | Burch | 74/7 E |
| 5,783,932 A | | 7/1998 | Namba et al. | |
| 6,676,555 B2 | * | 1/2004 | Duan | 475/231 |
| 6,732,529 B2 | * | 5/2004 | Anderson | 60/772 |
| 7,116,003 B2 | | 10/2006 | Hoppe | |
| 7,250,688 B2 | | 7/2007 | Thomson et al. | |
| 7,253,535 B2 | | 8/2007 | Duesterhoeft | |
| 7,481,062 B2 | * | 1/2009 | Gaines et al. | 60/792 |
| 7,485,981 B2 | | 2/2009 | Schwarz | |
| 7,690,205 B2 | | 4/2010 | Delalpye et al. | |
| 7,745,950 B2 | | 6/2010 | Lueck | |
| 7,997,085 B2 | * | 8/2011 | Moniz et al. | 60/788 |
| 2004/0035618 A1 | * | 2/2004 | Grassl et al. | 180/65.2 |
| 2006/0260323 A1 | * | 11/2006 | Moulebhar | 60/793 |

FOREIGN PATENT DOCUMENTS

EP 1 959 114 A2 8/2008

OTHER PUBLICATIONS

European Search Report, EP 11 25 0711.6, Rolls-Royce Corporation, Sep. 4, 2013.

* cited by examiner

*Primary Examiner* — Phutthiwat Wongwian
*Assistant Examiner* — Steven Sutherland
(74) *Attorney, Agent, or Firm* — Krieg DeVault LLP

(57) ABSTRACT

A turbine engine is disclosed herein. The turbine engine includes a starter/generator operable to deliver rotational power in a first mode of operation and to generate electrical power in a second mode of operation. The turbine engine also includes an accessory gear box mechanically coupled to the starter/generator. The turbine engine also includes a shaft mechanically coupled to the accessory gear box such that the accessory gear box is operably disposed between the shaft and the starter/generator. The turbine engine also includes a clutch operably disposed between the accessory gear box and the starter generator. The clutch is operable to slip in and out of full engagement in response to a first predetermined level of torque between the starter/generator and the accessory gear box.

18 Claims, 2 Drawing Sheets

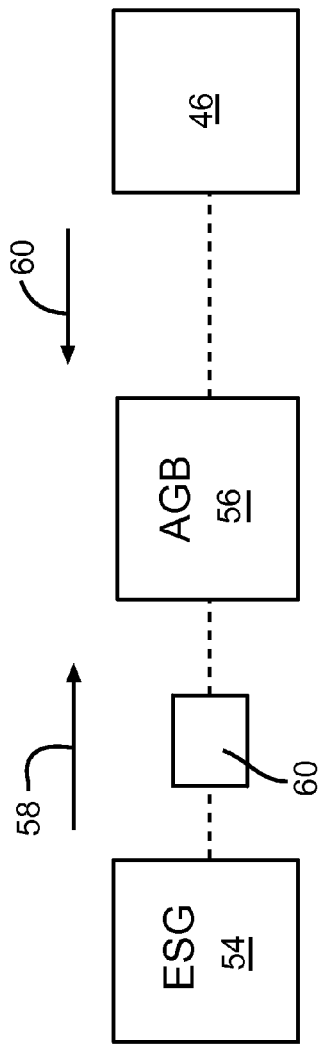
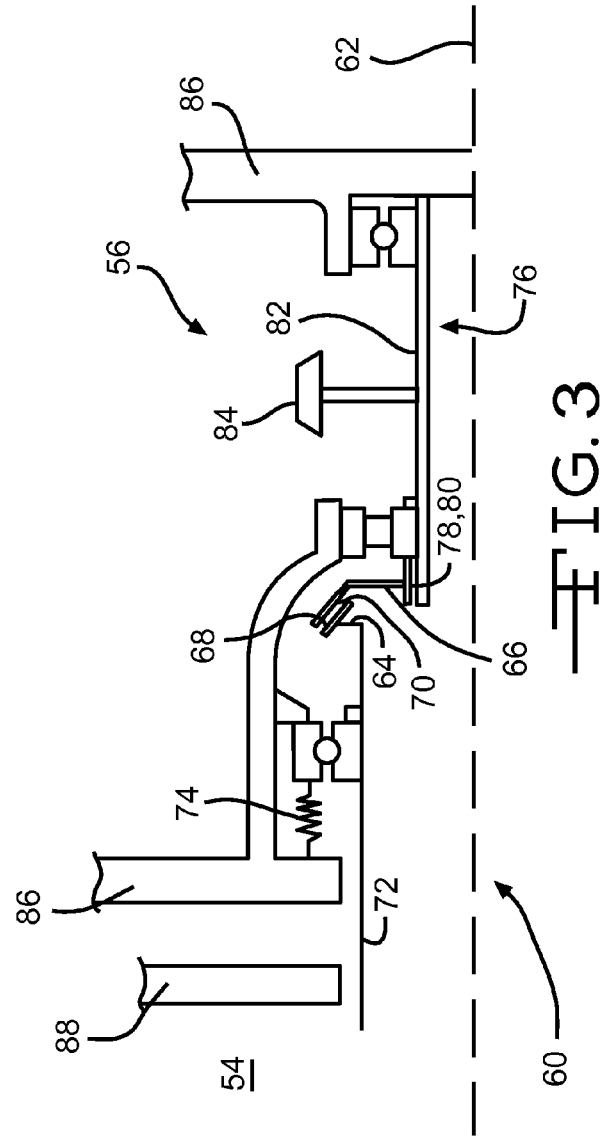

TURBINE ENGINE

BACKGROUND OF THE INVENTION

1. Field of the Invention

The invention relates to a turbine engine and more particularly to the arrangement between an electric starter/generator and a shaft of the turbine engine.

2. Description of Related Prior Art

U.S. Pat. No. 7,745,950 discloses a generator-starter system for a multi-shaft engine. In order to provide a high electric power for an aircraft via a generator driven by the engine, the system of the '950 patent includes an additional free turbine in the hot-gas flow of the engine which is equipped with generator-starter magnets and surrounded by annularly arranged generator-starter coils. This forms a generator-starter turbine and is connected to the high-pressure shaft via an overrunning clutch, and hence, is also used for starting the engine.

SUMMARY OF THE INVENTION

In summary, the invention is a turbine engine. The turbine engine includes a starter/generator operable to deliver rotational power in a first mode of operation and to generate electrical power in a second mode of operation. The turbine engine also includes an accessory gear box mechanically coupled to the starter/generator. The turbine engine also includes a shaft mechanically coupled to the accessory gear box such that the accessory gear box is operably disposed between the shaft and the starter/generator. The turbine engine also includes a clutch operably disposed between the accessory gear box and the starter generator. The clutch is operable to slip in and out of full engagement in response to a first predetermined level of torque between the starter/generator and the accessory gear box.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a schematic view of an arrangement between an electric starter/generator and a shaft of the turbine engine according to an exemplary embodiment of the invention; and FIG. 3 is a cross-section of an exemplary embodiment of the invention.

DETAILED DESCRIPTION OF AN EXEMPLARY EMBODIMENT

Figure 1:
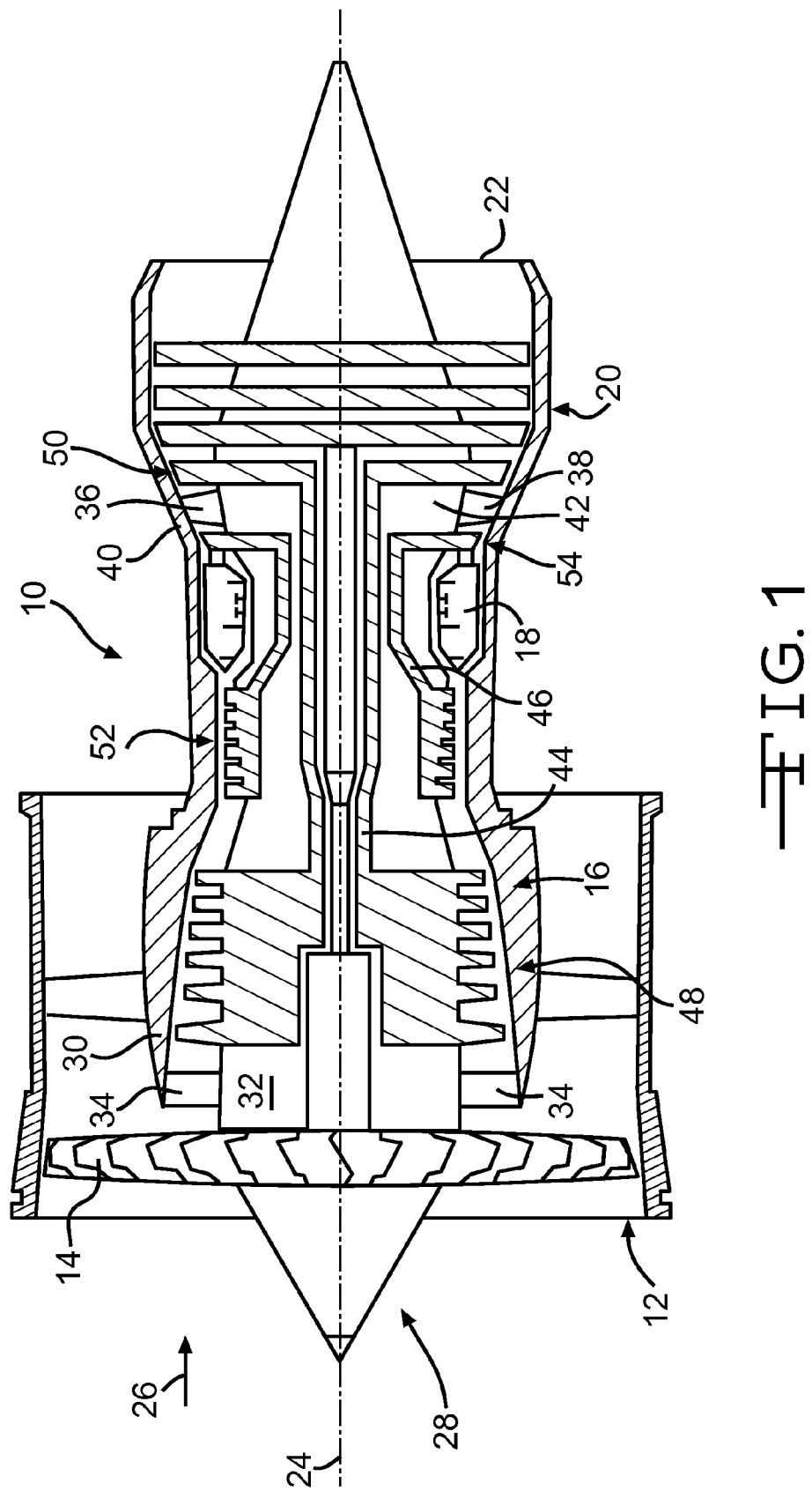
FIG. 1 is a schematic cross-section of a turbine engine incorporating an exemplary embodiment of the invention.

The implementation of high power electric starter/generator (ESG) units on aircraft engines has posed a challenge in that the ESG can impose a torque spike to the accessory gear box (AGB). To prevent damage to the AGB, a shear section can be incorporated with shafting that extends between the ESG and the AGB to prevent AGB damage or engine damage in the event of an ESG failure. The reasons for ESG failure are not always clear and when failure does occur the rotor of the ESG can bind/lock-up. Embodiments of the invention can eliminate the need for a shaft having shear section in the shaft. The design of a shear section in a shaft can be complex and the manufacture of a shear section is costly. Embodiments of the invention would allow the AGB to "slip" at the connection to the ESG such that any torque spikes induced by the ESG would be smoothed out. The exemplary embodiment is cone clutch, but other forms of limited-slip/friction devices can be applied in other embodiments of the invention. The extent of cone travel can be predetermined such that metal on metal contact is prevented in the result of an ESG failure. Another benefit enjoyed in at least some embodiments of the invention is that the gears and bearings associated with the AGB need not be over-sized to accommodate torque spikes from an ESG.

Referring to FIG. 1, a turbine engine 10 can include an inlet 12 and a fan 14. The exemplary fan 14 can be a bladed disk assembly having a disk or hub defining a plurality of slots and a plurality of fan blades, each fan blade received in one of the slots. In alternative embodiments of the invention, the fan can be a blisk wherein the hub and blades are integrally formed and unitary. The turbine engine can also include a compressor section 16, a combustor section 18, and a turbine section 20. The turbine engine 10 can also include an exhaust section 22. The fan 14, compressor section 16, and turbine section 20 include components arranged to rotate about a centerline axis 24. Fluid such as air can be drawn into the turbine engine 10 as indicated by the arrow referenced at 26. The fan 14 directs fluid to the compressor section 16 where it is compressed. A portion of the fluid can be diverted radially outside of the compressor section 16 and thereby become bypass flow. The compressed fluid emerging from the compressor section 16 is mixed with fuel and ignited in the combustor section 18. Combustion gases exit the combustor section 18 and flow through the turbine section 20. Energy is extracted from the combustion gases in the turbine section 20.

A nose cone assembly 28 can be attached to the fan 14. A turbine case 30 can encircle the core engine components (the compressor, combustor and turbine sections 16, 18, 20). The turbine case 30 can be fixed to a non-rotating hub 32 through a plurality of struts 34. Downstream of the combustor section 18, a row of turbine vanes, such as vanes 36, 38 can be positioned to direct the flow of combustion gases to the turbine section 20. The vanes 36, 38 can extend radially relative to the centerline axis 24, between an outer case 40 and an inner case 42. The outer case 40 can be integral with or separately formed from the case 30.

Shafts 44, 46 are shown disposed for rotation about the centerline axis 24 of the turbine engine 10. Alternative embodiments of the invention can include any number of shafts. The shafts 44, 46 can be journaled together for relative rotation. The shaft 44 can be a low pressure shaft supporting compressor blades 48 of a low pressure portion of the compressor section 16. The shaft 44 can also support low pressure turbine blades 50 of a low pressure portion of the turbine section 20. The shaft 46 encircles the shaft 44. Bearings can be disposed between the shafts 44, 46. The shaft 46 can be a high pressure shaft supporting compressor blades 52 of a high pressure portion of the compressor section 16. The shaft 46 can also support high pressure turbine blades 54 of a high pressure portion of the turbine section 20.

The turbine engine 10 can also include electric starter/generator (ESG) ESGs are well known and therefore not shown. During start-up, one of the shafts 44, 46 is rotated directly or indirectly by the ESG until the turbine engine 10 (through the compression of fluid and combustion of compressed fluid and fuel) can sustain the rotation of the shafts 44, 46. This is a first mode of operation for the ESG, an engine-starting mode. After the rotation of the shafts 44, 46 is self-sustaining, a rotor of the ESG can be rotated by one of the shafts 44, 46. The rotation of the rotor of the ESG results in the production of electrical power for use by the turbine engine 10 or by the vehicle in which the turbine engine 10 is positioned. This is a second mode of operation for the ESG, a generating mode. Any form of ESG can be applied in various embodiments of the invention. Also, the ESG can be positioned in numerous different locations along the centerline axis 24 in various embodiments of the invention.

It is also noted that power for accessories for the turbine engine 10 or for the vehicle in which the turbine engine 10 is positioned can be drawn from one of the shafts 44, 46. The power can be directed from one of the shafts 44, 46 through an accessory gear box (AGB). The AGB can include any number of gears desired, take numerous different physical forms, and be positioned at different locations along the centerline axis 24 in various embodiments of the invention.

FIG. 2 schematically shows the arrangement of an ESG, an AGB, and a shaft according to embodiments of the invention. The ESG is referenced at 54 and the AGB is referenced at 56. The shaft 46 is shown for illustrative purposes and it is noted that embodiments of the invention can apply the shaft 44 instead of the shaft 46. During start-up of the turbine engine, the ESG 54 can deliver rotational power through the AGB 56 to the shaft 46. This transmission of power is represented by arrow 58. As set forth above, this process can be viewed as the first mode of operation for the ESG 54. After the turbine engine has started and is operating, the ESG 54 can receive rotational power through the AGB 56 from the shaft 46. This transmission of power is represented by arrow 60. As set forth above, this process can be viewed as the second mode of operation for the ESG 54.

FIG. 2 also shows that the turbine engine 10 (referenced in FIG. 1) includes a clutch 60 operably disposed between the AGB 56 and the ESG 54. The clutch 60 is operable to slip in and out of full engagement in response to a first predetermined level of torque between the ESG 54 and the AGB 56. In other words, the clutch 60 can move out of engagement in response to the first predetermined level of torque between the AGB 56 and the ESG 54 such that the shaft 46 is mechanically isolated from the ESG 54 when the clutch 60 is out of full engagement. It can be desirable that the predetermined level of torque is greater than the level of torque that is required during engine start-up. Thus, the clutch 60 can be operable to move out of full engagement only after the turbine engine 10 has been started. It can also be desirable that the predetermined level of torque is greater than the level of torque expected during the generation of electrical power.

FIG. 3 shows a detailed cross-section of one embodiment of the invention. The exemplary cross-section is taken in a plane containing the centerline axis 24 (referenced in FIG. 1). The exemplary clutch 60 can be cone clutch substantially centered an axis 62. The axis 62 can be co-linear, parallel, oblique, or perpendicular to the centerline axis 24 in various embodiments of the invention. The clutch 60 can include a first member or portion 64 engaged with the ESG 54 and a second member or portion 66 engaged with the AGB 56. The first and second portions 64, 66 can be at least partially conical and the first portion 64 can be received in the second portion 66. The first and second portions 64, 66 can carry respective first and second frictional surfaces 68, 70 that mate with one another when the clutch 60 is in full engagement.

The first portion 64 can be engaged with an input member 72 of the ESG 54. The input member 72 can be the rotor of the ESG 54 or another component fixed for rotation with the rotor of the ESG 54. For example, the input member 72 can be a rotatable body. FIG. 3 shows the input member 72 extending into a housing 88 of the ESG 54. The first portion 64 can be fixed for rotation with input member 72 and be moveable along the axis 62. A spring 74 can bias the first portion 64 toward the second member 66 and can thus bias the clutch 60 into full engagement. When the level of torque between the ESG 54 and the AGB rises to the predetermined level, the first portion 64 moves away from the second portion 66 along the axis 62. This movement represents "slippage" of the clutch 60. The first portion 64 can return into engagement with the second portion 66 after separation if the level of torque remains below the predetermined level.

The second portion 66 can be engaged with an input member 76 of the AGB 56. The input member 76 can be a gear of the AGB 56 or another component fixed for rotation with a gear of AGB 56. FIG. 3 shows the input member 76 having a shaft portion 82 and a gear portion 84. The gear portion 84 is shown housed in a housing 86 of the AGB 56. Generally, the input member 76 can be a rotatable body. The second portion 66 can be fixed for rotation with input member 72 and be moveable along the axis 62 relative to the input member 76 such as for assembly. The second portion 66 can be removably connected to the input member 76. For example, the second portion can include splines 78 that mate with splines 80 of the input member 76. Generally, in the exemplary embodiment, it is expected that the second portion 66 is substantially fixed along the axis 62 during operation. The spline connection can be desirable to reduce cost and simplify maintenance/replacement of the clutch 60.

The clutch 60 can function such that the first and second frictional surfaces 68, 70 can fail in response to a second predetermined level of torque greater than the first predetermined level of torque. For example, the clutch 60 can slip in response to the first predetermined level of torque. However, in response to a substantially instantaneous torque spike greater than the first predetermined level of torque, the first and second frictional surfaces 68, 70 can become permanently inoperative. This will ensure a high level of protection for the shaft 46 in the event the ESG 54 fails and the clutch 60 does not slip as desired. Components of the clutch 60 can be designed and sized such that metal-to-metal contact does not occur if one of said first and second abrasive surfaces 68, 70 fail, thus protecting other components.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A turbine engine comprising:

a starter/generator operable to deliver rotational power in a first mode of operation and to generate electrical power in a second mode of operation;

an accessory gear box mechanically coupled to said starter/generator;

a shaft mechanically coupled to said accessory gear box such that said accessory gear box is operably disposed between said shaft and said starter/generator; and a clutch operably disposed between said accessory gear box and said starter/generator and operable to slip in and out of full engagement in response to a first predetermined level of torque between said starter/generator and said accessory gear box, wherein said clutch includes first and second frictional surfaces that mate with one another when said clutch is in full engagement, and wherein said first and second frictional surfaces become permanently inoperative in response to a second predetermined level of torque greater than said first predetermined level of torque, wherein components of the clutch are sized and an amount of travel of the clutch is predetermined such that components other than the frictional surfaces do not contact one another when one of the first and second frictional surfaces becomes permanently inoperative.

2. The turbine engine of claim 1 wherein said shaft is mechanically isolated from said starter/generator when said clutch is out of full engagement.

3. The turbine engine of claim 1 further comprising:
a spring biasing said clutch into full engagement.

4. The turbine engine of claim 1 wherein said clutch is operable to move out of full engagement only after said turbine engine has been started.

5. The turbine engine of claim 1 wherein said clutch is further defined as a cone clutch.

6. The turbine engine of claim 1 wherein said starter/generator includes an input member and wherein said clutch includes a first member carrying one of said first and second frictional surfaces, said first member fixedly engaged with said input member of said starter/generator.

7. The turbine engine of claim 6 wherein said accessory gear box includes an input member and wherein said clutch includes a second member carrying the other of said first and second frictional surfaces, said second member engaged with said input member of said accessory gear box through splines.

8. The turbine engine of claim 7 wherein said first and second members of said clutch are disposed along an axis and wherein said second member is fixed along said axis during operation and said first member is operable to move along said axis during operation.

9. The turbine engine of claim 1, wherein the components of the clutch are structured such that metal-to-metal contact does not occur if one of the first and second frictional surfaces becomes permanently inoperative.

10. A method comprising the steps of:
starting a turbine engine with a starter/generator;
coupling the turbine engine and the starter/generator through an accessory gear box;
generating electrical power with the starter/generator after said starting step;
positioning a slippable clutch between the accessory gear box and the starter/generator such that the clutch moves out of engagement in response to a first predetermined level of torque between the accessory gear box and the starter/generator; and
forming a first abrasive surface and a second abrasive surface of the clutch to become permanently inoperative in response to a substantially instantaneous torque spike greater than the first predetermined level of torque,
sizing components of the clutch and predetermining an amount of travel of the clutch such that contact between components other than the abrasive surfaces does not occur when one of the first and second abrasive surfaces becomes permanently inoperative.

11. The method of claim 10 further comprising the step of:
selecting the first predetermined level of torque to be greater than the torque generated during said starting step.

12. The method of claim 10 further comprising the steps of:
substantially centering the clutch about an axis; and
arranging the clutch such that at least a portion of the clutch is moveable along the axis.

13. The method of claim 12 wherein said arranging step is further defined as:
arranging the clutch such that a first portion of the clutch is moveable along the axis and second portion of the clutch is fixed along the axis.

14. The method of claim 13 further comprising the step of:
biasing the clutch into engagement by urging the first portion along the axis.

15. The method of claim 13 further comprising the step of:
engaging the first portion of the clutch with the starter/generator and the second portion with the accessory gear box.

16. The method of claim 15 further comprising the steps of:
forming the second portion distinct from the accessory gear box; and removably connecting the second portion to the accessory gear box.

17. The method of claim 10 wherein said positioning step is further defined as:
positioning a slippable cone clutch between the accessory gear box and the starter/generator such that the first abrasive surface of an inner cone of the cone clutch moves out of engagement with the second abrasive surface of an outer portion of the cone clutch in response to a first predetermined level of torque between the accessory gear box and the starter/generator.

18. The method of claim 17 further comprising the step of:
sizing the components of the cone clutch such that metal-to-metal contact does not occur if one of said first and second abrasive surfaces fail.

* * * * *